(12) United States Patent
Lee et al.

(10) Patent No.: US 9,273,897 B2
(45) Date of Patent: Mar. 1, 2016

(54) REFRIGERATOR AND CONTROL METHOD FOR AGING OF MEAT

(75) Inventors: Ji Young Lee, Seoul (KR); Joo Young Ha, Seoul (KR); Mi Sun Park, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 708 days.

(21) Appl. No.: 13/067,971

(22) Filed: Jul. 12, 2011

(65) Prior Publication Data

US 2012/0042664 A1    Feb. 23, 2012

(30) Foreign Application Priority Data

Aug. 20, 2010 (KR) .................. 10-2010-0080578

(51) Int. Cl.
| | |
|---|---|
| F25D 31/00 | (2006.01) |
| F25D 29/00 | (2006.01) |
| A23L 1/318 | (2006.01) |
| A23B 4/06 | (2006.01) |

(52) U.S. Cl.
CPC ............... *F25D 29/00* (2013.01); *A23B 4/068* (2013.01); *A23L 1/3187* (2013.01)

(58) Field of Classification Search
CPC .................................................. A23L 1/3187
USPC ............................................... 62/62, 157
See application file for complete search history.

(56) References Cited

U.S. PATENT DOCUMENTS

| 2,384,203 A | 9/1945 | Sperti |
| 2,650,882 A | 9/1953 | Sperti |
| 3,377,941 A * | 4/1968 | Jaremus .................. 99/468 |
| 2008/0066485 A1 | 3/2008 | Park et al. |

FOREIGN PATENT DOCUMENTS

| GB | 882239 | * | 2/1960 | ............. A23L 1/318 |
| JP | 2006-329521 | | 12/2006 | |

OTHER PUBLICATIONS

KR 20090106052 (english abstract).*
European Search Report issued Dec. 3, 2013 in corresponding European Application No. 11175130.1.

* cited by examiner

*Primary Examiner* — Jonathan Bradford
(74) *Attorney, Agent, or Firm* — Staas & Halsey LLP

(57) ABSTRACT

In a control method of a refrigerator having a storage chamber for aging of meat, an operation to keep the storage chamber at an aging temperature and an operation to cool the storage chamber to a cooling temperature lower than the aging temperature are repeated. This enables optimal aging of meat via an aging time and aging temperature suitable for meat.

10 Claims, 5 Drawing Sheets

REFRIGERATOR AND CONTROL METHOD FOR AGING OF MEAT

CROSS-REFERENCE TO RELATED APPLICATIONS

This application claims the benefit of Korean Patent Application No. 2010-0080578, filed on Aug. 20, 2010 in the Korean Intellectual Property Office, the disclosure of which is incorporated herein by reference.

BACKGROUND

1. Field

Embodiments relate to a refrigerator and a control method thereof, which enable aging and storage of meat at appropriate temperatures.

2. Description of the Related Art

Generally, after decapitation, poultry experiences rigor mortis characterized by stiffness of muscles or joints. While undergoing rigor mortis, poultry meat becomes stiff and has an unpleasant taste, having poor market quality.

However, once the muscle stiffness peaks, meat begins to undergo self-digestion by protease, etc. and becomes tender. Self-digestion increases the PH and exudation of muscles, and involves, e.g., digestion of proteins into constituent amino acids by the action of enzymes, improving taste.

For this reason, meat in rigor mortis may be kept at a predetermined temperature to reach maximum stiffness. This is called "aging".

Although the aged meat has superior tenderness, excessively long aging may deteriorate the quality of the meat due to propagation of microorganisms and acidification of fat, and in the worst case, may become inedible. Therefore, it may be important to select an appropriate aging method and aging period.

SUMMARY

Therefore, it is an aspect to provide a refrigerator and a control method thereof, in which meat repeatedly undergoes aging and cooling until completely aged.

Additional aspects will be set forth in part in the description which follows and, in part, will be apparent from the description, or may be learned by practice of the invention.

In accordance with one aspect, a control method of a refrigerator having a storage chamber separately provided in a refrigerating compartment for aging of meat, includes keeping the storage chamber at an aging temperature for a preset first time, and cooling the storage chamber to a cooling temperature lower than the aging temperature for a preset second time after the first time passes, and repeatedly cycling the storage chamber between the aging temperature and the cooling temperature to enable aging of meat.

The first time may be set to be longer than the second time.

The temperature of the storage chamber may be repeatedly controlled to the aging temperature and the cooling temperature for a preset meat aging period until the meat is completely aged, and the control method may further include keeping the storage chamber at a preset storage temperature to store the completely aged meat after the meat aging period passes.

In accordance with another aspect, a refrigerator having a storage chamber separately defined in a refrigerating compartment for aging of meat, includes a cooling system to cool the storage chamber, and a control unit to repeat an operation to keep the storage chamber at an aging temperature for a preset first time and an operation to cool the storage chamber to a cooling temperature lower than the aging temperature for a preset second time by driving the cooling system after the first time passes.

The first time may be set to be longer than the second time.

The control unit may control a temperature of the storage chamber for a preset meat aging period until the meat is completely aged, and may keep the storage chamber at a preset storage temperature to store the completely aged meat after the meat aging period passes.

In accordance with another aspect, a control method of a refrigerator having a storage chamber separately provided in a refrigerating compartment for aging of meat, includes keeping the storage chamber at an aging temperature, cooling the storage chamber to a cooling temperature lower than the aging temperature, and repeatedly cycling the storage chamber between the aging temperature and the cooling temperature to enable aging of meat.

The temperature of the storage chamber may be repeatedly controlled in such a manner that the storage chamber is kept at the aging temperature for a preset first time and is cooled to the cooling temperature for a preset second time after the first time passes.

The first time may be set to be longer than the second time.

The temperature of the storage chamber may be repeatedly controlled to the aging temperature and the cooling temperature for a preset meat aging period until the meat is completely aged.

The control method may further include storing the completely aged meat at a preset storage temperature of the storage chamber after the meat aging period passes.

The aging temperature may be in a range of about 1° C. to about 5° C., the cooling temperature may be in a range of about −3° C. to about −1° C., the storage temperature may be in a range of about −2° C. to about 0° C., and the meat aging period may be about 2 days to about 7 days.

The control method may further include inputting a meat aging mode by a user.

In accordance with a further aspect, a refrigerator having a storage chamber separately defined in a refrigerating compartment for aging of meat, includes a cooling system to cool the storage chamber, and a control unit to repeat an operation to keep the storage chamber at a preset aging temperature and an operation to cool the storage chamber to a cooling temperature lower than the aging temperature by driving the cooling system.

The control unit may repeat an operation to keep the storage chamber at the aging temperature for a preset first time and an operation to cool the storage chamber to the cooling temperature for a preset second time after the first time passes.

The first time may be set to be longer than the second time.

The control unit may repeatedly control the temperature of the storage chamber to the aging temperature and the cooling temperature for a preset meat aging period until the meat is completely aged.

The control unit may keep the storage chamber at a preset temperature to store the completely aged meat after the meat aging period passes.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
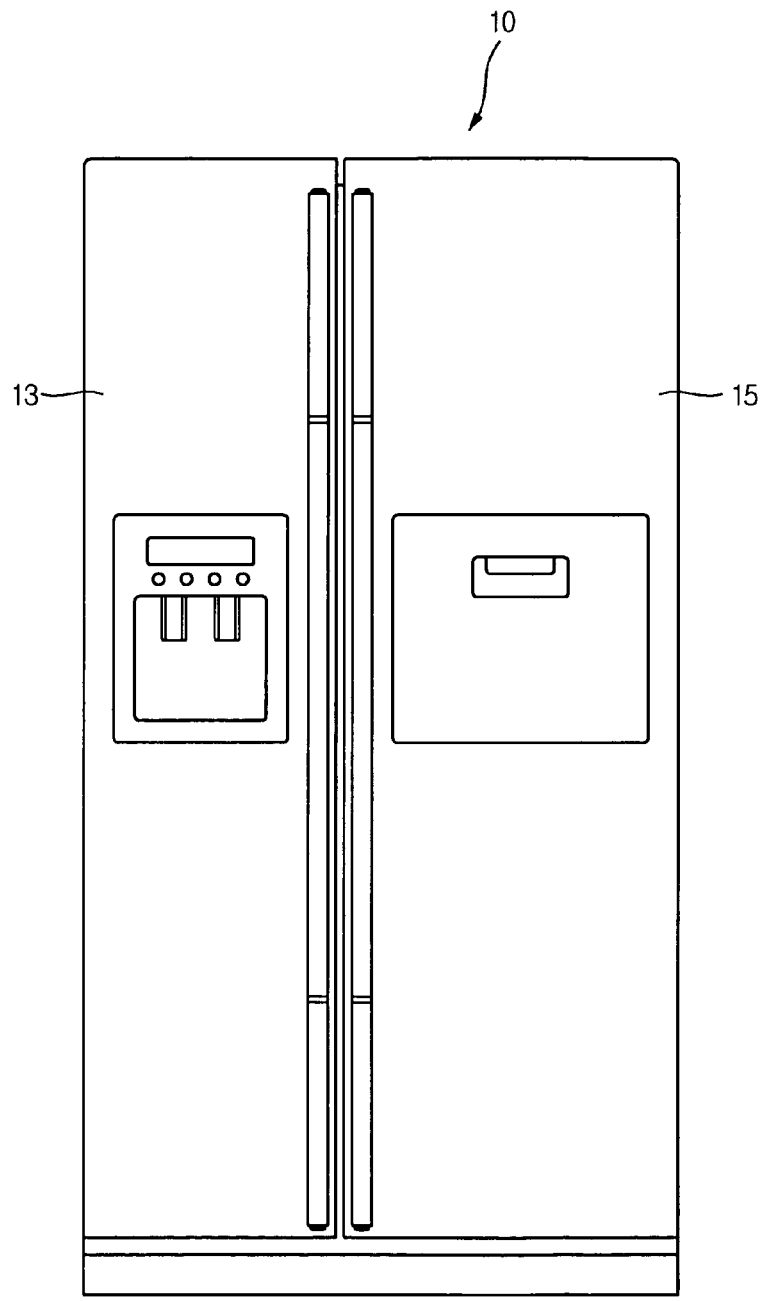
FIG. 1 is a front view illustrating an exterior configuration of a refrigerator according to an embodiment.

Reference will now be made in detail to the embodiments, examples of which are illustrated in the accompanying drawings, wherein like reference numerals refer to like elements throughout.

Hereinafter, a refrigerator and a control method thereof according to an exemplary embodiment will be described in detail with reference to FIGS. 1 to 5.

Figure 2:
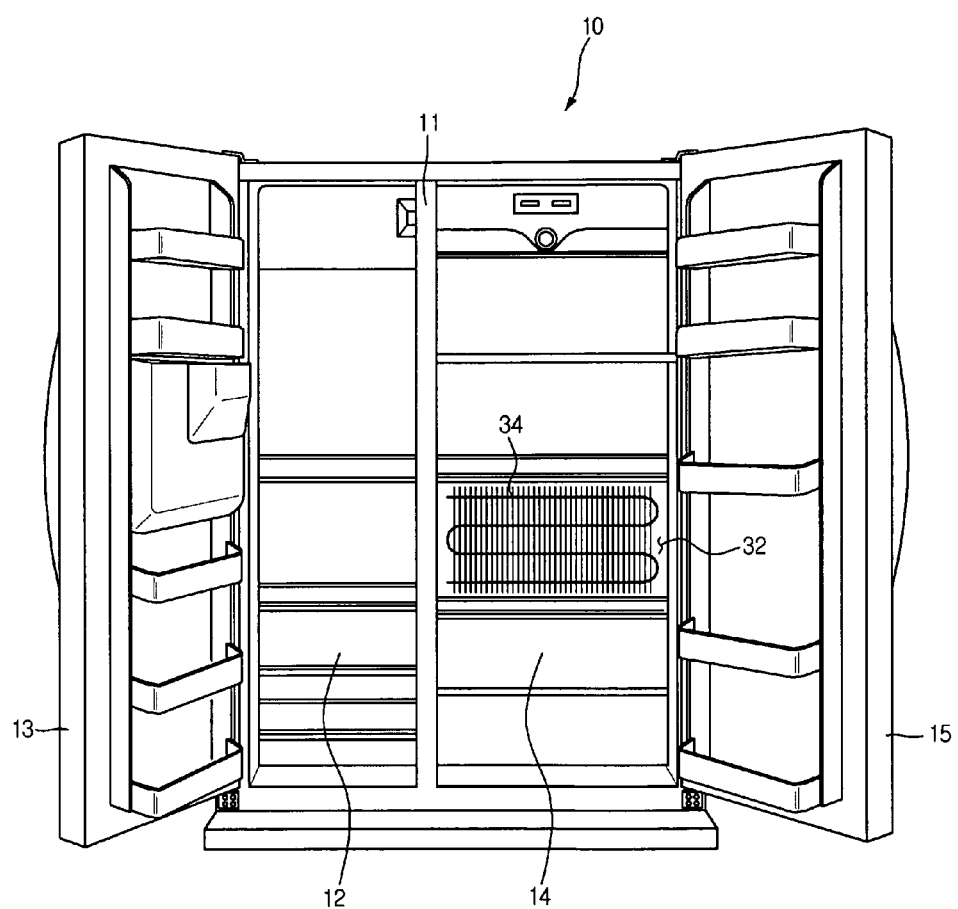
FIG. 2 is a front view illustrating an interior configuration of the refrigerator according to the embodiment.

FIG. 1 is a front view illustrating an exterior configuration of a refrigerator having a storage chamber (a variable temperature compartment) according to the embodiment, and FIG. 2 is a front view illustrating an interior configuration of the refrigerator according to the embodiment.

Referring to FIGS. 1 and 2, the refrigerator according to the embodiment includes a body 10 in which a freezing compartment 12 and a refrigerating compartment 14 are defined, and doors 13 and 15 hingedly coupled to the body 10 to open or close the freezing compartment 12 and the refrigerating compartment 14 respectively. The freezing compartment 12 and the refrigerating compartment 14 are horizontally divided by a partition 11 provided in the body 10 to prohibit movement of cold air between the compartments 12 and 14.

The refrigerating compartment 14 contains a separate storage chamber (a variable temperature chamber) 32 in which food requiring specific storage conditions (for example, meat) is stored. The interior temperature of the storage chamber 32 is controllable to appropriate temperatures to enable aging and storage of food.

The storage chamber 32 is provided in a rear region thereof with an evaporator 34 and a heater (not shown). The evaporator 34 is formed of a conventional refrigerant pipe to realize cooling of the storage chamber 32, and the heater is formed of a conventional electric heat wire to realize aging of food.

In addition, a temperature sensor (not shown) may be further provided in the storage chamber 32 to sense the interior temperature of the storage chamber 32.

Although the present embodiment describes the single storage chamber 32 defined in the body 10 as illustrated in FIGS. 1 and 2, a plurality of storage chambers may be provided as necessary. If the plurality of storage chambers 32 is provided, the respective storage chambers 32 may be separated from one another by insulators such that the separated storage chambers 32 may be synchronously operated, or may be independently operated to perform aging and cooling functions respectively.

Also, although the present embodiment describes the storage chamber 32 as being defined in a lower region of the refrigerating compartment 14, the double door type refrigerator may have any one of a configuration in which a pair of storage chambers is defined respectively in lower regions of the freezing and refrigerating compartments 12 and 14, a configuration in which a storage chamber is defined only in the lower region of the freezing compartment 12, and a configuration in which a single storage chamber is defined in a lower region throughout the freezing compartment 12 and the refrigerating compartment 14.

Figure 3:
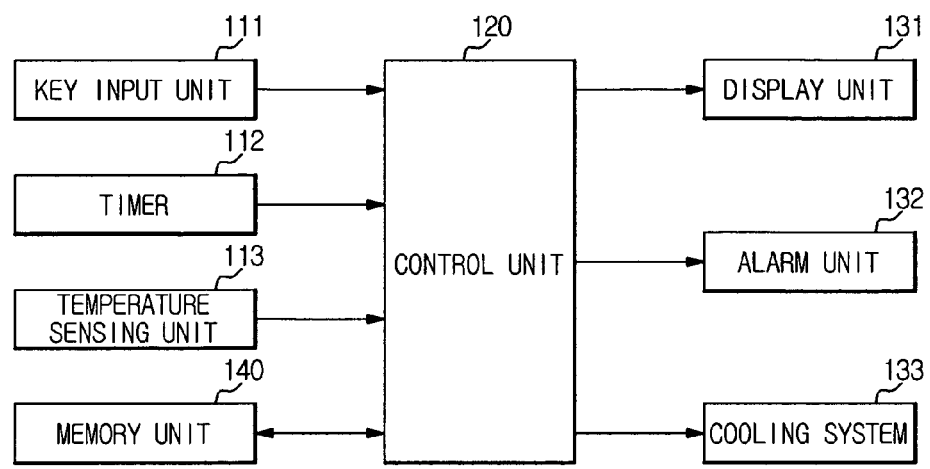
FIG. 3 is a control block diagram of the refrigerator according to the embodiment.

FIG. 3 is a control block diagram of the refrigerator according to the embodiment. In FIG. 3, a key input unit 111 to input a control command, a timer 112, a temperature sensing unit 113, a control unit 120, a display unit 131 to display the operational state of the refrigerator, an alarm unit 132, a cooling system 133 and a memory unit 140 are illustrated.

The key input unit 111 includes a plurality of buttons including a start button to start temperature control of the storage chamber 32, and an aging mode selection button to select a meat aging mode.

The timer 112 is provided at the body and is used to count aging time after meat aging begins. The counted aging time may be transmitted to the control unit 120 so as to be stored in the control unit 120, or may be stored in the memory unit 140 by way of the control unit 120.

The temperature sensing unit 113 serves as a temperature sensor to sense the temperature of the storage chamber 32 and is electrically connected to the control unit 120. Various kinds of temperature sensors may be used and installed at various positions suitable to sense the interior temperature of the storage chamber 32. For example, if a separate storage container is provided in the storage chamber 32, the temperature sensor may be installed at a proper interior position of the storage container. It is noted that the temperature sensing unit 113 assists more accurate temperature control of the storage chamber 32 and is non-essential.

The display unit 131 serves to display the aging degree of meat. The control unit 120 allows a user to perceive the aging degree evaluated by the total aging time counted by the timer 112 via the display unit 131.

The alarm unit 132 may be provided to inform the user of completion of the aging of meat via the control unit 120. The alarm unit 132 also informs the user that the storage chamber 32 automatically switches to a refrigerating storage state after completion of the aging of meat.

The alarm unit 132 is not limited to any particular alert manner. For example, the alarm unit 132 may be a visual alarm device in which a Light Emitting Diode (LED) is turned on and off with a predetermined periodicity, or may be an audible alarm device to generate a predetermined alarm sound, or may use both the visual and audible alarm devices simultaneously.

The memory unit 140 stores meat aging data to be used upon control of the aging of meat.

Meat aging data includes an appropriate ratio of aging time to cooling time of meat, a storage temperature, and a meat aging period, and, for example, is summarized in the following Table 1.

TABLE 1

| Aging Time:Cooling Time | 5:1 |
|---|---|
| Storage Temperature | −2~0° C. |
| Meat Aging Period | 2~7 days |

In Table 1, the ratio of aging time to cooling time of meat, storage temperature, and meat aging period, which are controllable for meat aging, are experimentally obtained values, and may be changed by a designer.

The control unit 120 is electrically connected to the cooling system 133 to cool the storage chamber 32, and the memory unit 140 controls the temperature of the storage chamber 32 based on the stored meat aging data.

Specifically, if a meat aging mode is input via the key input unit 111, the control unit 120 stops the cooling system 133 and keeps the temperature of the storage chamber 32 at a predetermined aging temperature for a predetermined time, to enable the aging of meat.

In addition, to prevent the meat from being contaminated by various bacteria and fungi such as molds during aging, the control unit 120 controls the cooling system 133, which is composed of an evaporator, a compressor, a condenser, a cooling fan, etc., to cool the storage chamber 32 for a predetermined time.

In the present embodiment, the control unit 120 repeats the aging of meat and the cooling of the storage chamber 32 until the meat stored in the storage chamber 32 is completely aged. That is, the control unit 120 periodically operates and stops the cooling system 133 until the meat is completely aged.

With the above described method, the control unit 120 may allow the meat to be aged to have desired taste and freshness while preventing freezing of the meat.

Figure 4:
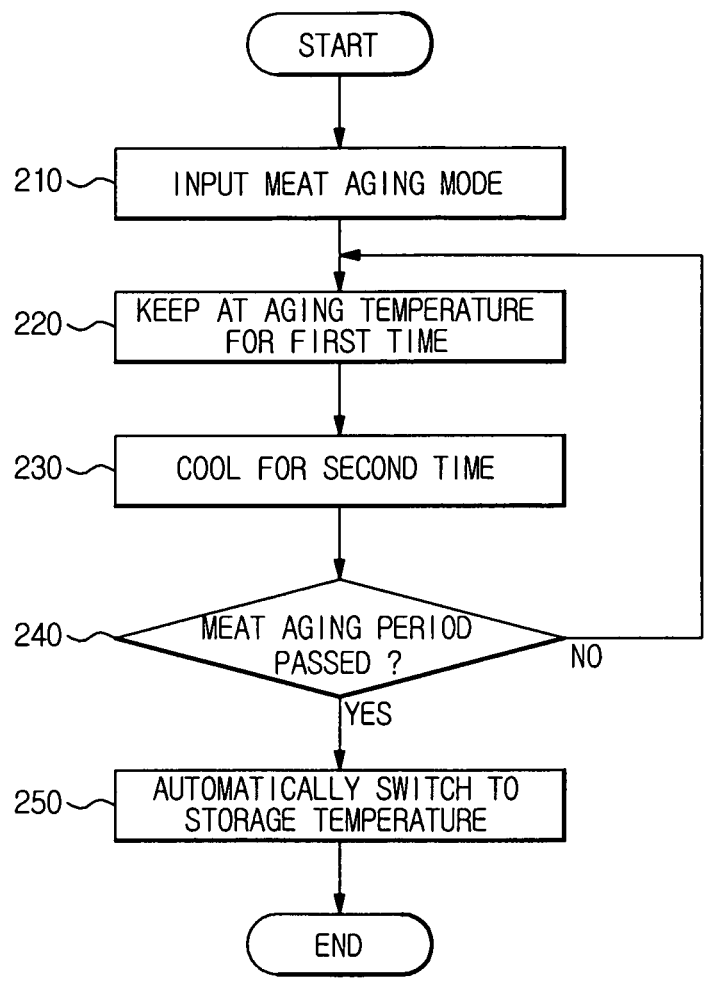
FIG. 4 is a flow chart illustrating a control method of the refrigerator according to an embodiment.

FIG. 4 is a flow chart illustrating a meat aging control method according to an embodiment.

First, the user inputs a meat aging mode using the key input unit (210).

In response to the input meat aging mode, the control unit controls the cooling system of the storage chamber to enable the aging of meat.

Specifically, if the meat aging mode is input by the user (210), the control unit initiates the aging of meat (220). That is, the control unit stops the cooling system to allow the temperature of the storage chamber to rise. In this case, the risen aging temperature of the storage chamber may be in a range of 1~5° C.

Although the control unit cannot stop the cooling system until meat is completely aged, it may be necessary to control the operation of the cooling system in consideration of the state of stored meat because less fresh meat may decompose due to propagation of microorganisms during aging.

In the present embodiment, to prevent decomposition of meat, the cooling system may be periodically operated to cool the storage chamber (230). The cooling temperature of the storage chamber may be controlled to prevent freezing of meat while restricting growth of microorganisms.

The control unit repeats the above described aging and cooling operations 220 and 230 for a meat aging period (240). The meat aging period is a time required to complete the aging of meat and may be 2~7 days.

That is, the control unit repeats operation 220 to age the meat stored in the storage chamber and operation 230 to cool the storage chamber until the meat is completely aged (240).

More specifically, the control unit alternately repeats the operation to age the meat stored in the storage chamber at an aging temperature for a preset first time (220), and the operation to cool the storage chamber for a preset second time after the first time passes (230). Here, in operation 230 to cool the storage chamber for the second time, the cooling temperature may be set in a range of −3~−1° C. at which meat does not freeze, and may be set such that the average temperature of the storage chamber during cooling is substantially equal to a storage temperature of the completely aged meat (in the present embodiment, e.g., −2° C.).

Here, the first time may be longer than the second time, and in the present embodiment, may be five times the second time.

For example, if the meat aging mode is input by the user (210), the control unit allows the meat to be aged at the aging temperature of 1~5° C. for 10 hours (220). After the aging time of 10 hours passes, the control unit operates the cooling system to cool the storage chamber, i.e. the meat stored in the storage chamber for 2 hours (230). The aging and cooling operations constitute a single cycle. The cycle may be performed twice a day for the aging period of 2~7 days (240).

Figure 5:
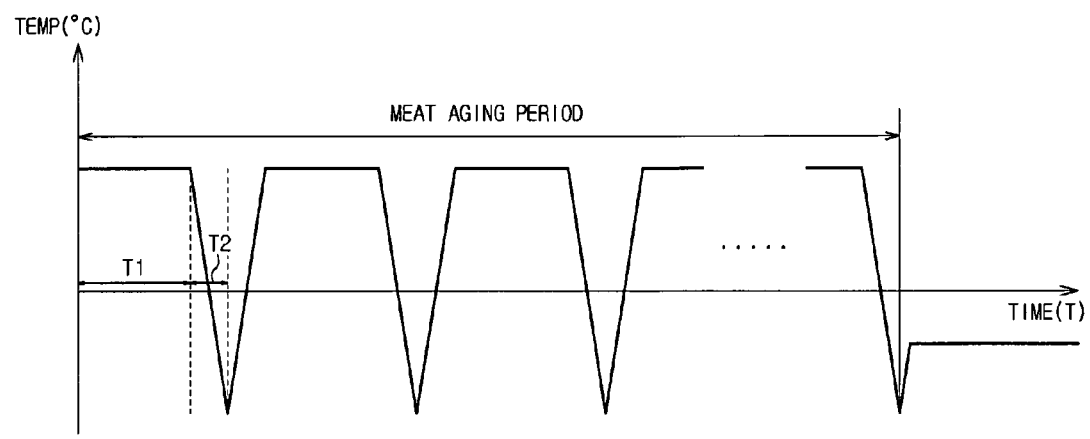
FIG. 5 is a graph illustrating temperature variation of a storage chamber according to the control method of the refrigerator of FIG. 4.

FIG. 5 illustrates temperature variation of the storage chamber according to the above described control method. Referring to FIG. 5, it will be appreciated that the cycle consisting of the aging operation to keep the meat at the aging temperature for the first time T1 and the cooling operation to cool the meat for the second time T2 is periodically repeated for the meat aging period.

In this way, by repeatedly changing the temperature of the storage chamber, it may be possible to soften the texture of meat, achieving high quality meat.

Once the meat is completely aged via repeated implementation of the cycle consisting of the aging and cooling operations, the control unit automatically controls the temperature of the storage chamber to a predetermined storage temperature (250). The optimal meat storage temperature may be in a range of −2~0° C.

Specifically, the control unit evaluates the aging degree of meat by comparing the total aging time counted by the timer starting from an aging beginning time with a preset meat aging period stored in the memory unit. If the total aging time counted by the timer is shorter than the meat aging period, the control unit repeats the cycle of aging and cooling operations 220 and 230. Then, if the total aging time becomes equal to the meat aging period, the control unit completes aging of meat and automatically controls the temperature of the storage chamber to the storage temperature (250).

As will be appreciated from FIG. 5 illustrating the temperature variation of the storage chamber according to the above described control method, the temperature of the storage chamber is kept at a constant temperature after the meat aging period passes.

It is noted that the present embodiment does not concentrate on numerical values of the control temperature of the storage chamber, aging and cooling times and meat aging period. The present embodiment is designed to provide a series of operations to provide delicious and tender fresh meat by repeating the aging and cooling of meat until the meat is completely aged and keeping the aged meat at a constant temperature.

As is apparent from the above description, a refrigerator and a control method thereof according to the embodiment of the present invention may realize optimal aging of meat using an aging time and temperature suitable for meat. Further, it may be possible to realize optimal storage of the aged meat using a storage temperature suitable for meat.

Furthermore, it may be possible to soften the texture of meat by repeating aging and cooling of meat until the meat is completely aged. By controlling a cooling time so as to be shorter than the aging time, it may be possible to ensure freshness of the aged meat while preventing freezing of meat and growth of microorganisms.

As a result, the refrigerator and the control method thereof according to the embodiment may provide a consumer with delicious and tender high quality meat.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A control method of a refrigerator having a storage chamber separately provided in a refrigerating compartment for aging of meat, comprising:

keeping the storage chamber at an aging temperature for a first time, and cooling the storage chamber to a cooling temperature lower than the aging temperature for a second time after the first time passes; and repeatedly cycling the storage chamber between the aging temperature and the cooling temperature to enable aging of meat, wherein the temperature of the storage chamber is repeatedly controlled to the aging temperature and the cooling temperature for a preset meat aging period until the meat is aged, the temperature of the storage chamber being repeatedly controlled to the aging temperature and the cooling temperature such that the aging temperature and the cooling temperature are each reached at least two times during the meat aging period, and the control method further comprises keeping the storage chamber at a storage temperature to store the aged meat after the meat aging period passes, wherein the aging temperature and the cooling temperature are determined within preset ranges, respectively, which are separated from each other, wherein the first time and the second time are preset, respectively, the first time is set to be longer than the second time, and the storage temperature is determined between the aging temperature and the cooling temperature.

2. A refrigerator having a storage chamber separately defined in a refrigerating compartment for aging of meat, comprising:

a cooling system to cool the storage chamber; and a control unit to repeat an operation to keep the storage chamber at an aging temperature for a first time and an operation to cool the storage chamber to a cooling temperature lower than the aging temperature for a second time by driving the cooling system after the first time passes, wherein the control unit controls a temperature of the storage chamber for a preset meat aging period until the meat is aged, the control unit causing the storage chamber to reach the aging temperature and the cooling temperature at least two times each during the meat aging period, and keeps the storage chamber at a storage temperature to store the aged meat after the meat aging period passes, wherein the aging temperature and the cooling temperature are determined within preset ranges, respectively, which are separated from each other, wherein the first time and the second time are preset, respectively, the first time is set to be longer than the second time, and the storage temperature is determined between the aging temperature and the cooling temperature.

3. A control method of a refrigerator having a storage chamber separately provided in a refrigerating compartment for aging of meat, comprising:

keeping the storage chamber at an aging temperature for a first time;

cooling the storage chamber to a cooling temperature lower than the aging temperature for a second time when the first time passes; and repeatedly cycling the storage chamber between the aging temperature and the cooling temperature to enable aging of meat, wherein the temperature of the storage chamber is repeatedly controlled to the aging temperature and the cooling temperature for a preset meat aging period until the meat is aged, the temperature of the storage chamber being repeatedly cycled between the aging temperature and the cooling temperature such that the aging temperature and the cooling temperature are each reached at least two times during the meat aging period, wherein the aging temperature and the cooling temperature are determined within preset ranges, respectively, which are separated from each other, wherein the first time and the second time are preset, respectively, the first time is set to be longer than the second time, and a storage temperature is determined between the aging temperature and the cooling temperature.

4. The control method according to claim 3, wherein the temperature of the storage chamber is repeatedly controlled in such a manner that the storage chamber is kept at the aging temperature for the first time and is cooled to the cooling temperature for the second time after the first time passes.

5. The control method according to claim 3, further comprising storing the aged meat at the storage temperature of the storage chamber after the meat aging period passes.

6. The control method according to claim 5, wherein:

the aging temperature is in a range of about 1° C. to about 5° C.;

the cooling temperature is in a range of about −3° C. to about −1° C.;

the storage temperature is in a range of about −2° C. to about 0° C.; and the meat aging period is about 2 days to about 7 days.

7. The control method according to claim 3, further comprising inputting a meat aging mode by a user.

8. A refrigerator having a storage chamber separately defined in a refrigerating compartment for aging of meat, comprising:

a cooling system to cool the storage chamber; and a control unit to repeat an operation to keep the storage chamber at an aging temperature for a first time and an operation to cool the storage chamber to a cooling temperature lower than the aging temperature for a second time by driving the cooling system after the first time passes, wherein the control unit repeatedly controls the temperature of the storage chamber to the aging temperature and the cooling temperature for a preset meat aging period until the meat is aged, the control unit causing the storage chamber to reach the aging temperature and the cooling temperature at least two times each during the meat aging period, wherein the aging temperature and the cooling temperature are determined within preset ranges, respectively, which are separated from each other, wherein the first time and the second time are preset, respectively, the first time is set to be longer than the second time, and a storage temperature is determined between the aging temperature and the cooling temperature.

9. The refrigerator according to claim 8, wherein the control unit repeats an operation to keep the storage chamber at the aging temperature for a preset first time and an operation to cool the storage chamber to the cooling temperature for a preset second time after the first time passes.

10. The refrigerator according to claim 8, wherein the control unit keeps the storage chamber at the storage temperature to store the aged meat after the meat aging period passes.

* * * * *